(12) United States Patent
Murakami (10) Patent No.: US 10,305,203 B2
(45) Date of Patent: May 28, 2019

(54) BUS BAR AND METHOD OF MANUFACTURING BUS BAR

(71) Applicant: Yazaki Corporation, Tokyo (JP)

(72) Inventor: Tomoyasu Murakami, Hiroshima (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/956,413

(22) Filed: Apr. 18, 2018

(65) Prior Publication Data

US 2018/0316104 A1 Nov. 1, 2018

(30) Foreign Application Priority Data

Apr. 28, 2017 (JP) .................................. 2017-090117

(51) Int. Cl.
| | | |
|---|---|---|
| *H02B 1/20* | (2006.01) | |
| *H02G 5/00* | (2006.01) | |
| *H01R 11/01* | (2006.01) | |
| *H01B 13/06* | (2006.01) | |
| *H01R 9/24* | (2006.01) | |
| *B23K 26/21* | (2014.01) | |
| *B23K 31/02* | (2006.01) | |
| *H01R 43/02* | (2006.01) | |
| *H01M 2/20* | (2006.01) | |

(Continued)

(52) U.S. Cl.
CPC .............. *H01R 11/01* (2013.01); *B23K 26/21* (2015.10); *B23K 31/02* (2013.01); *H01B 13/06* (2013.01); *H01M 2/20* (2013.01); *H01M 2/206* (2013.01); *H01R 9/2458* (2013.01); *H01R 43/0221* (2013.01); *H01R 11/288* (2013.01); *H01R 43/24* (2013.01); *H01R 2201/26* (2013.01); *H02G 5/06* (2013.01)

(58) Field of Classification Search
CPC . H02G 5/025; H02G 5/00; H02G 5/02; H02B 1/21; H02B 1/20; H02B 1/00; H05K 2201/10272; H05K 2203/167; H05K 5/00; H01R 13/53; H01R 25/16
USPC ....... 174/135, 72 B, 71 B, 88 B, 70 B, 99 B, 174/129 B, 133 B, 149 B, 68.2; 361/600, 361/601, 624, 627, 637, 639, 648, 675, 361/611, 699.2; 439/212, 213, 210, 76.1, 439/76.2, 949, 55, 66, 114; 29/453, 592, 29/428, 449, 592.1
See application file for complete search history.

(56) References Cited

U.S. PATENT DOCUMENTS

| | | | | |
|---|---|---|---|---|
| 4,358,633 A | * | 11/1982 | Reynolds, Jr. ......... | H02G 5/005 174/72 B |
| 4,394,532 A | * | 7/1983 | Aguayo .................. | H02G 5/005 174/72 B |

(Continued)

FOREIGN PATENT DOCUMENTS

JP 2006-187122 A 7/2006

*Primary Examiner* — Angel R Estrada
(74) *Attorney, Agent, or Firm* — Sughrue Mion, PLLC (57) ABSTRACT

A bus bar including a main body having conductivity and an insulative body covering the main body. The insulative body includes a first member that allows transmission laser light having a predetermined wavelength, a second member that absorbs the laser light, and a welding portion. The first member and the second member are welded to each other at least at a part of a contact portion between the first member and the second member in the welding portion. The main body includes a contact point exposed from the insulative body.

16 Claims, 5 Drawing Sheets

(51) Int. Cl.
*H01R 11/28* (2006.01)
*H02G 5/06* (2006.01)
*H01R 43/24* (2006.01)

(56) References Cited

U.S. PATENT DOCUMENTS

| | | | | | |
|---|---|---|---|---|---|
| 4,584,768 | A | * | 4/1986 | Tosti | H02G 5/005 |
| | | | | | 174/72 B |
| 4,867,696 | A | * | 9/1989 | Demler, Jr. | H02G 5/005 |
| | | | | | 174/72 B |
| 5,055,059 | A | * | 10/1991 | Logstrup | H02B 1/21 |
| | | | | | 174/72 B |
| 6,024,589 | A | * | 2/2000 | Hahn, IV | H05K 1/148 |
| | | | | | 174/71 B |
| 6,490,169 | B1 | * | 12/2002 | Watanabe | H01R 12/79 |
| | | | | | 174/72 B |
| 7,547,848 | B2 | * | 6/2009 | Gilliland | H02G 5/00 |
| | | | | | 174/133 B |
| 7,869,193 | B2 | * | 1/2011 | Nohara | H02M 5/271 |
| | | | | | 361/624 |

* cited by examiner

BUS BAR AND METHOD OF MANUFACTURING BUS BAR

CROSS REFERENCE TO RELATED APPLICATIONS

This application claims priority from Japanese Patent Application No. 2017-090117 filed on Apr. 28, 2017, the entire contents of which are incorporated herein by reference.

BACKGROUND OF THE INVENTION

Field of the Invention

The present invention relates to a bus bar that includes a conductive main body and an insulative body that covers the main body, and a method of manufacturing the bus bar.

Description of Related Art

In a related art, from viewpoints of a reduction in size and space saving, a circuit structure has been suggested in which a bus bar is used instead of electric wire for transmitting electrical power. For example, in a circuit structure of a related art, in order to secure insulating properties between a bus bar and a peripheral member, an insulating film is formed on a surface of a bus bar by spraying insulating powder to the bus bar (for example, see Patent Literature 1: JP-A-2006-187122).

[Patent Literature 1] JP-A-2006-187122

In a case where an insulating film is formed on a bus bar used in a circuit structure of a related art, a portion of the bus bar (for example, a portion used as an electrical contact) is exposed without being covered with the insulating film. As a method of forming an exposed portion, for example, during a spraying of a insulating powder to the bus bar, a process of masking a portion to be exposed in advance and a process of controlling a range where a conductive powder is sprayed may be performed. However, the process of masking a portion to be exposed in advance is complicated, and thus workability of manufacturing a bus bar may deteriorate. In the process of controlling a range where a conductive powder is sprayed, a possibility that the powder may be scattered and attached to the portion to be exposed cannot be completely excluded, and the insulating film may be unintentionally formed on a portion to be exposed. Conversely, in a case where the spraying of the conductive powder is insufficient, pinholes and the like may also be formed on the insulating film.

As another method of forming the insulating film, for example, the bus bar is covered with a thermally shrinkable tube, and then the tube is caused to thermally shrink so as to adhere to the bus bar such that the insulating layer is formed. However, in a case where the bus bar has a complex shape (for example, a two-dimensionally three-dimensionally curved shape), it is difficult to match the shape of the tube to the shape of the bus bar.

SUMMARY

One or more embodiments provide a bus bar that can be easily manufactured while securing reliability regarding electrical connection as a bus bar, and a method of manufacturing the bus bar.

In an aspect (1), a bus bar including a main body having conductivity and an insulative body covering the main body. The insulative body includes a first member that allows transmission of laser light having a predetermined wavelength, a second member that absorbs the laser light, and a welding portion. The first member and the second member are welded to each other at least at a part of a contact portion between the first member and the second member in the welding portion. The main body includes a contact point exposed from the insulative body.

In an aspect (2), the main body has a curved shape.

In an aspect (3), one of the first member and the second member has a protrusion part protruding to the other of the first member or the second member. The other of the first member or the second member has a recess part corresponding to the protrusion part. The first member and the second member are welded to each other in a state that the protrusion part is inserted into the recess part.

In an aspect (4), the main body is a thin sheet-shaped conductor. The first member is disposed along a main surface of the main body. The second member includes a pair of side walls covering the main body and the first member so as to interpose the main body and the first member between the pair of side walls in a width direction of the main body, and a welding piece extending from the pair of side walls to a gap between the main body and the first member.

According to the aspect (1), the first member and the second member are disposed to cover the conductive main body, and then the contact portion between the first member and the second member is irradiated with the laser light while transmitting through the first member, thereby welding the first member and the second member. As a result, the insulative body can be formed. Further, by adjusting the shape of the first member and the second member such that a part of the main body (for example, an end portion of the main body) is exposed, the contact point can be easily formed.

As a result, it is not necessary to perform a masking process in advance, and the main body can be reliably covered with the insulative body. In addition, erroneous formation of the insulating film on the contact points does not occur, and it is not necessary to worry about formation of pinholes and the like on the insulating film during the formation of the insulating film. Further, only the portion to be welded can be heated by the irradiation of the laser light. Therefore, as compared to a case where the entire area of the bus bar is heated for welding, the insulative body can relatively easily formed without worrying about deformation and discoloration due to heat.

Thus, the bus bar having the above-described configuration can be easily manufactured while securing reliability regarding electrical connection as a bus bar.

According to the aspect (2), a bus bar can be configured in which the main body having a complex shape is appropriately covered with the insulative body. In other words, even in a case where the main body has a complex shape, a bus bar can be easily formed while securing reliability regarding electrical connection as a bus bar.

According to the aspect (3), in a case where the main body is covered with the first member and the second member, the protrusion part and the recess part are engaged with each other. As a result, positioning between the first member and the second member can be easily performed. Further, after welding the first member and the second member to each other, positional deviation between the first member and the second member can be prevented. Moreover, since the protrusion part and the recess part are engaged with each other, the contact area (so-called creeping distance) between the first member and the second member can be increased by the engaging extent. Therefore, insulating properties and the like of the main body can be improved.

According to the aspect (4), in a case where the main body is covered with the first member and the second member, the first member is inserted in the second member in the width direction. Therefore, positioning between welding can be more reliably performed, and positional deviation between the first member and the second member after welding can also be more reliably prevented. In addition, the welding piece can be irradiated with the laser light transmitting through the first member from the main surface side of the main body. Therefore, the insulative body can be relatively easily formed. Further, the dimension of the bus bar in the width direction can be reduced, and the size of the bus bar can be reduced.

In an aspect (5), a manufacturing method for a bus bar including a main body having conductivity and an insulative body covering the main body, the method including covering the main body with a first member and a second member in a state that a part of the main body is exposed as a contact point, the first member allowing transmission of laser light having a predetermined wavelength, and the second member absorbing the laser light and welding the first member and the second member to each other at least at a part of a contact portion between the first member and the second member so as to form the insulative body.

In an aspect (6), at least one of the first member and the second member has a surface to be welded on which roughness is higher than roughness on a surface not to be welded, before the welding.

According to the aspect (5), the first member and the second member are disposed to cover the conductive main body, and then the contact portion between the first member and the second member is irradiated with the laser light while transmitting through the first member to weld the first member and the second member. As a result, the insulative body can be formed. Further, by adjusting the shape of the first member and the second member such that a part of the main body (for example, opposite ends of the main body) is exposed, the contact point can be easily formed.

As a result, it is not necessary to perform the masking process in advance as described above, and the main body can be reliably covered with the insulative body. In addition, erroneous formation of the insulating film on the contact points does not occur, and it is not necessary to worry about formation of pinholes and the like on the insulating film during the formation of the insulating film. Further, the insulative body can be relatively easily formed by the irradiation of the laser light.

Thus, with the method of manufacturing the bus bar having the above-described configuration, the bus bar can be easily manufactured while securing reliability regarding electrical connection as a bus bar.

According to the aspect (6), the surface roughness before welding of the portion to be welded is high. Therefore, an increase in the contact area between the first member and the second member during welding is expected, and the first member and the second member can be more strongly welded to each other.

According to one or more embodiments, a bus bar that can be easily manufactured while securing insulating properties from peripheral members, and a method of manufacturing such a bus bar can be provided.

Hereinabove, the invention has been briefly described. Further, a mode for carrying out the invention (hereinafter, referred to an "embodiment") is read through with reference to the accompanying drawings, thereby further clarifying the details of the invention.

DETAILED DESCRIPTION

Embodiment

Hereinafter, a bus bar 1 according to an embodiment of the invention and a method of manufacturing the same will be described with reference to the drawings.

Figure 1A:
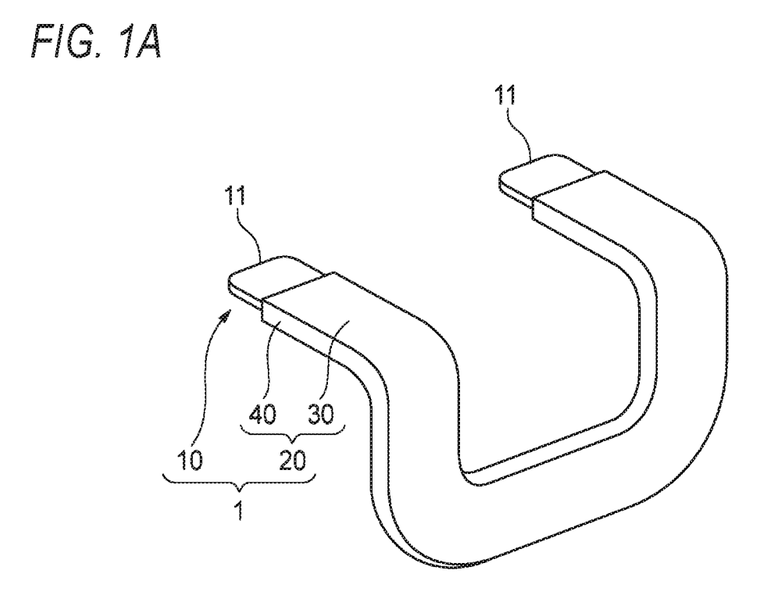
FIG. 1A is a perspective view illustrating a bus bar according to an embodiment of the invention and FIG. 1B is a perspective view in which a main body covered with an insulative body of FIG. 1A is indicated by a broken line.
Figure 1B:
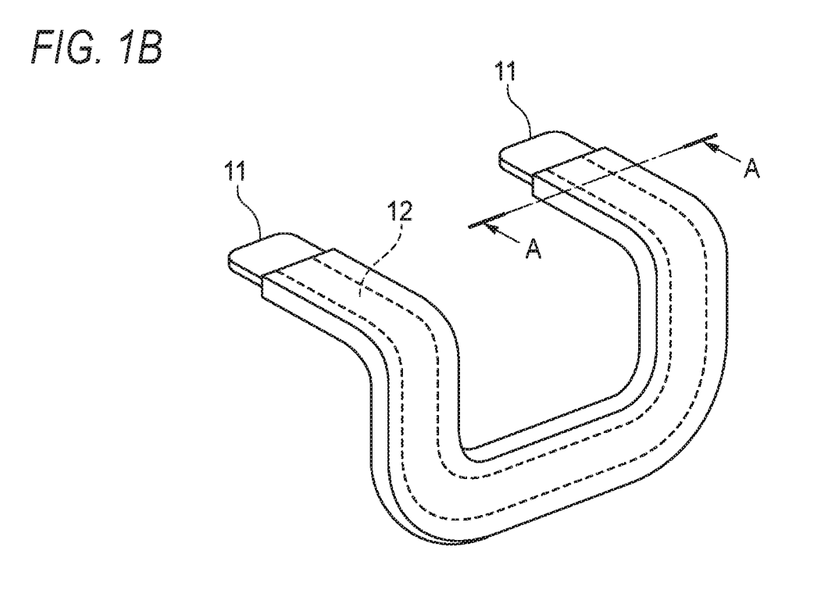

As illustrated in FIGS. 1A and 1B, the bus bar 1 includes a conductive main body 10 and an insulative body 20 that covers the main body 10. The insulative body 20 includes: a first member 30 that allows transmission of laser light having a predetermined wavelength; and a second member 40 that absorbs the laser light. FIG. 1A is a perspective view illustrating the external appearance of the bus bar 1, and FIG. 1B is a perspective view in which a portion (hereinafter, referred to as "non-exposed portion 12") of the main body 10 provided inside the insulative body 20 is indicated by broken line.

In the example illustrated in FIGS. 1A and 1B, the main body 10 has a shape in which a thin sheet-shaped conductor extends in a U-shape while being three-dimensionally curved. At opposite end portions of the U-shaped main body 10, contact points 11 that are not covered with the insulative body 20 are provided. The entire area of the main body 10 excluding the pair of contact points 11 is covered with the insulative body 20.

Figure 2:
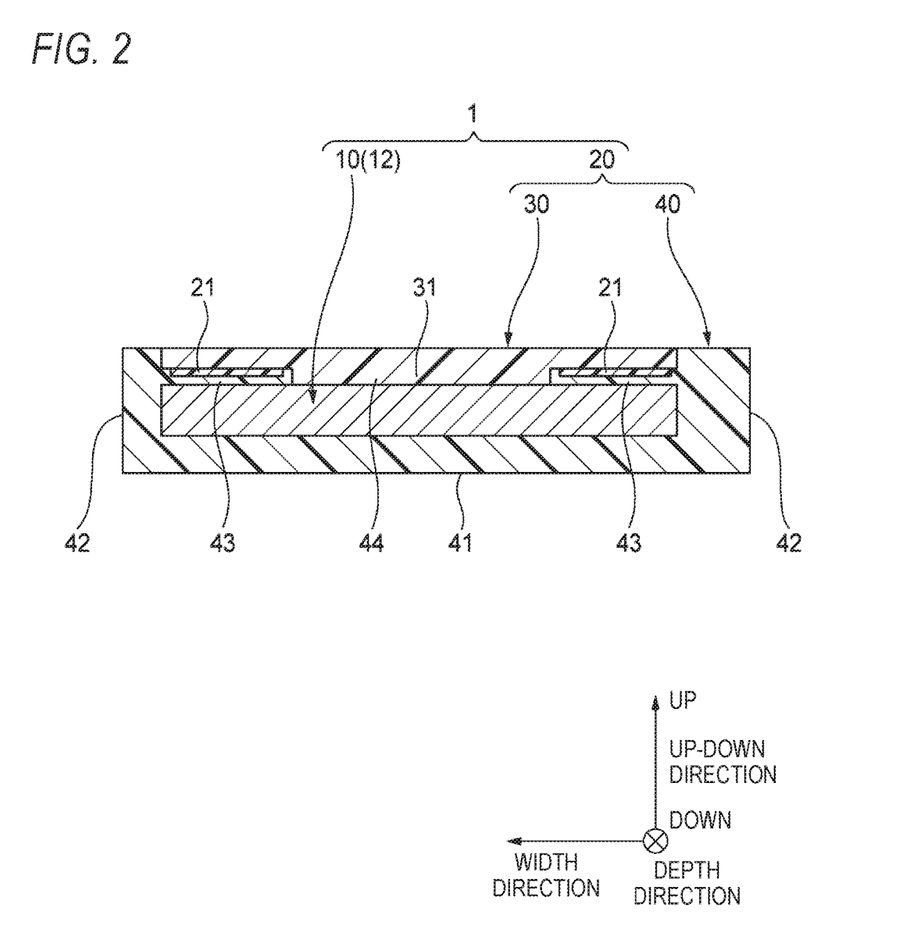
FIG. 2 is a cross-sectional view taken along line A-A of FIG. 1B.

In the portion (corresponding to the non-exposed portion 12) of the bus bar 1 in which the main body 10 is covered with the insulative body 20, a structure of a cross-section perpendicular to an extending direction of the main body 10 is uniform in the extending direction. Hereinafter, the structure of the portion of the bus bar 1 in which the main body 10 is covered with the insulative body 20 will be described with reference to FIG. 2 which is a cross-sectional view taken along line A-A of FIG. 1B. Hereinafter, for convenience of description, "depth direction", "width direction", "up-down direction", "up", and "down" will be defined as illustrated in FIG. 2. "Depth direction", "width direction", and "up-down direction" are perpendicular to each other.

As illustrated in FIG. 2, the first member 30 constituting the insulative body 20 has a flat thin sheet shape that extends in the width direction. On a center portion of a lower surface of the first member 30 in the width direction, a protrusion part 31 that protrudes downward is formed.

The second member 40 constituting the insulative body 20 includes: a bottom wall portion 41 that extends in the width direction; and a pair of side wall portions 42 that protrude upward from opposite end portions of the bottom wall portion 41 in the width direction, and has a shape having a U-shape in cross-section and having an opening that is formed upwardly. Further, the second member 40 includes a pair of welding pieces 43 that extend from intermediate positions of the side wall portions 42 in the up-down direction to the inside in the width direction, respectively, the intermediate positions being positioned on inner surfaces of the side wall portions 42 in the width direction. Tip end surfaces of the pair of welding pieces 43 face each other at a predetermined distance in the width direction. As a result, a recess part 44 that is recess parted downward is formed between the tip end surfaces.

The thin sheet-shaped main body 10 (specifically, the non-exposed portion 12) is disposed inside the second member 40 so as to be interposed between the pair of side wall portions 42 in the width direction and to be interposed between the bottom wall portion 41 and the pair of welding pieces 43 in the up-down direction. The thin sheet-shaped first member 30 is disposed inside the second member 40 so as to close the upwardly formed opening of the second member 40, to be interposed between the pair of side wall portions 42 in the width direction, and to be placed on the pair of welding pieces 43. As a result, the first member 30 is disposed along an upper surface of the main body 10. In addition, the pair of welding pieces 43 are disposed so as to extend from the pair of side walls 42 to gaps between the main body 10 and the first member 30.

The protrusion part 31 of the first member 30 is inserted into the recess part 44 of the second member 40. The dimension of the recess part 44 in the width direction (that is, the distance between the tip end surfaces of the pair of welding pieces 43 in the width direction) is substantially the same as the dimension of the protrusion part 31 in the width direction. In addition, the dimension (thickness) of the pair of welding pieces 43 in the up-down direction is substantially the same as the dimension (protruding dimension) of the protrusion part 31 in the up-down direction. Due to the above-described shape, opposite side surfaces of the protrusion part 31 and the pair of welding pieces 43 adhere to each other and a lower surface of the protrusion part 31 the upper surface of the main body 10 adhere to each other substantially without a gap. In addition, since the protrusion part 31 and the recess part 44 are engaged with each other, the contact area (so-called creeping distance) between the first member 30 and the second member 40 can be increased compared to adherence between simple planes. Therefore, insulating properties and the like of the main body 10 (non-exposed portion 12) can be improved.

The first member 30 is formed of a material that allows transmission of laser light having a predetermined wavelength (for example, laser light having a wavelength in an infrared range), and the second member 40 is formed of a material that absorbs the laser light. The transmission and absorption of the laser light is not particularly limited as long as it can realize welding between the first member 30 and the second member 40 described below. It is not necessary that the first member 30 allows permeation of 100% of the laser light, and it is not necessary that the second member 40 absorbs 100% of the laser light. The first member 30 and the second member 40 are typically formed of a thermoplastic elastomer (TPE). The hardness of the thermoplastic elastomer can be adjusted by adjusting a composition and the like thereof, and thus the insulative body having a strength corresponding to the use of bus bar and the like can be configured.

The first member 30 is typically transparent but may have an opaque color (for example, orange). The second member 40 is typically black but may have an opaque color (for example, orange). The colors of the first member 30 and the second member 40 may be appropriately set according to the use of the bus bar 1 and the like without any particular limitation.

The first member 30 and the second member 40 are welded to each other by a pair of welding portions 21 that are formed in the depth direction at least at a part (or the entire area) of contact portions between a low lower surface of the first member 30 and upper surfaces of the pair of welding pieces 43, and are inseparably fixed to each other. The main body 10 and the second member 40 are not fixed to each other.

Next, the process of manufacturing the bus bar 1 having the above-described configuration will be described with reference to FIGS. 3A to 3C.

First, the main body 10, the first member 30, and the second member 40 are prepared. The first member 30 and the second member 40 are formed by injection molding so as to have a three-dimensional shape corresponding to a three-dimensional shape of the main body 10. In addition, the first member 30 and the second member 40 are formed such that a surface roughness of at least one of the upper surfaces of the pair of welding pieces 43 and the lower surface of the first member 30 (excluding the protrusion part 31) is higher than that of the other portions. For example, by forming embossed fine unevenness on the surfaces, the surface roughness of the surfaces can be increased.

Figure 3A:
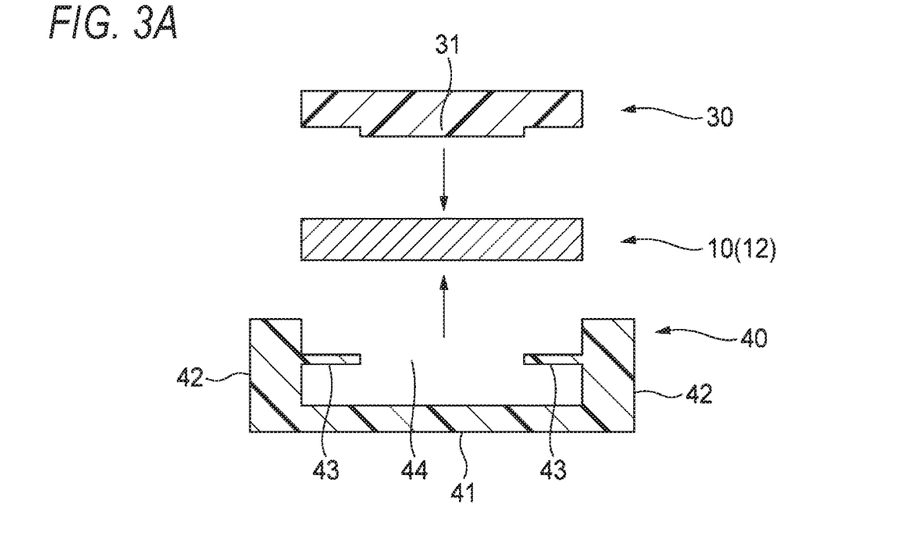
FIGS. 3A to 3C are views corresponding to FIG. 2 and illustrating respective steps of a process of manufacturing the bus bar.

Next, as illustrated in FIG. 3A, the main body 10 is disposed in an internal space of the second member 40, which is positioned below the pair of welding pieces 43, such that the pair of contact points 11 are exposed. At this time, the disposition of the main body 10 may be performed by inserting the main body 10 into the space from above in a state where the pair of welding pieces 43 are lifted up to be deformed and then returning the pair of welding pieces 43 to the original state, or may be performed by inserting the main body 10 into the space along the depth direction.

Next, the first member 30 is disposed in an internal space of the second member 40, which is positioned above the pair of welding pieces 43, such that the upwardly formed opening of the second member 40 is closed and the protrusion part 31 is inserted into the recess part 44. At this time, by engaging the protrusion part 31 and the recess part 44 with each other, positioning between the first member 30 and the second member 40 is easily performed. In addition, in this state, the entire area of the upper surfaces of the pair of welding pieces 43 is in contact with the lower surface of the first member 30.

Figure 3B:
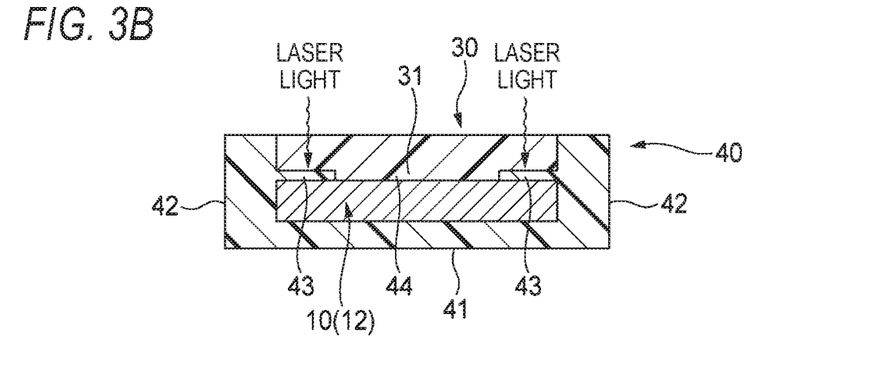

Next, as illustrated in FIG. 3B, laser light having a predetermined wavelength and a predetermined intensity transmits through the first member 30 from above and the upper surfaces of the pair of welding pieces 43 are irradiated with the laser light. This irradiation performed while relatively moving an irradiation position of the laser light in the depth direction at a predetermined rate. The irradiation of the laser light may be continuously performed along the welding pieces 43, or may be intermittently (in spots) performed along the welding pieces 43. By providing the welding pieces 43, the dimension of the bus bar 1 in the width direction can be reduced, and the size of the bus bar 1 can be reduced. In this example, only the welding pieces 43 are irradiated with the laser light. However, not only on the welding pieces 43 but also other contact portions (or all the contact portions) between the first member 30 and the second member 40 may be irradiated with the laser light. By increasing the area of portions to be welded, the contact area (so-called creeping distance) between the first member 30 and the second member 40 can be increased, and the insulating properties of the main body 10 can be further improved.

During the irradiation of the laser light, the first member 30 having properties of allowing transmission of the laser light does not absorb the laser light and thus is not directly heated by the laser light. On the other hand, the upper surfaces of the pair of welding pieces 43 having properties of absorbing the laser light absorb the irradiated laser light and thus are directly heated by the laser light. At this time, the lower surface of the first member 30 in contact with the upper surfaces of the pair of welding pieces 43 is also indirectly heated.

Figure 3C:
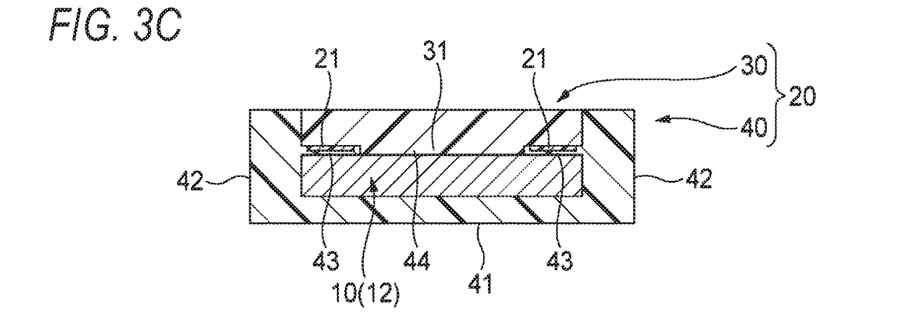

As a result, as illustrated in FIG. 3C, portions irradiated with the laser light in the contact portions between the lower surface of the first member 30 and the upper surfaces of the pair of welding pieces 43 are heated to high temperature, softened, and welded to each other to form welding portions 21. At this time, as described above, the surface roughness of at least one of the upper surfaces of the pair of welding pieces 43 and the lower surface of the first member 30 (excluding the protrusion part 31) is higher than that of the other portions. Therefore, the contact area of the first member 30 and the second member 40 which are welded increases, and the first member 30 and the second member 40 can be strongly welded.

Through the above-described steps, the pair of welding portions 21 are formed along the depth direction. As result, the first member 30 and the second member 40 are welded to each other along the depth direction at the pair of welding portions 21, and the bus bar 1 illustrated in FIGS. 1A and 1B is completed.

Figure 4:
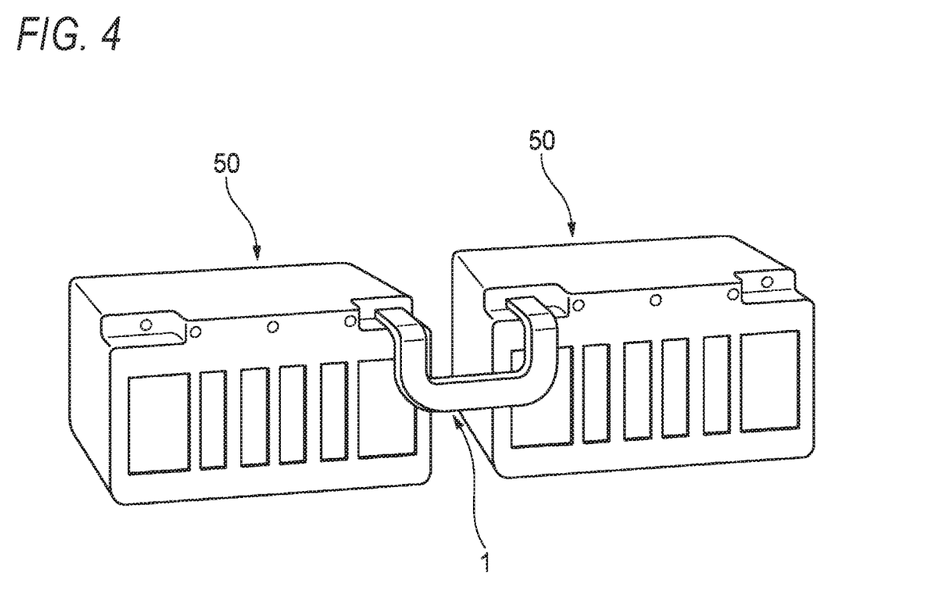
FIG. 4 is a diagram illustrating a case where battery modules are electrically connected through the bus bar as an usage example of the bus bar.

For example, as illustrated in FIG. 4, the completed bus bar 1 is used for electrically connecting adjacent battery modules 50.

As described above, in the bus bar 1 according to the embodiment of the invention and the method of manufacturing the same, the first member 30 and the second member 40 are disposed to cover the conductive main body 10 in a state where a part of the main body 10 is exposed as the contact points 11, and then the laser light transmits through the first member 30 and the contact portions between the first member 30 and the second member 40 are irradiated with the laser light. As a result, the first member 30 and the second member 40 can be welded while securing the contact points 11.

As a result, as compared to a case where the insulative body 20 is formed by spraying insulating powder, it is not necessary to perform a masking process in advance, and erroneous formation of the insulating film on the contact points does not occur, and it is not necessary to worry about formation of pinholes and the like on the insulating film during the formation of the insulating film. Further, the insulative body 20 can be easily configured by the irradiation of the laser light.

Thus, according to the bus bar 1 having the above-described configuration, a bus bar that can be easily manufactured while securing reliability regarding electrical connection as a bus bar can be provided.

Further, even in a case where the main body 10 has a complex shape, insulating properties from peripheral members can be reliably secured by covering the main body 10 with the first member 30 and the second member 40 that are formed in a shape corresponding to the shape of the main body 10.

Further, by engaging the protrusion part 31 of the first member 30 and the recess part 44 of the second member 40, positioning between the first member 30 and the second member 40 can be easily performed, and positional deviation between the first member 30 and the second member 40 after welding can be prevented.

Further, the first member 30 and the second member 40 can be welded by allowing the laser light to transmit through the first member 30 to irradiate the pair of the welding pieces 43 with the laser light. Further, the first member 30 is inserted in the second member 40 in the width direction. Therefore, positional deviation between the first member 30 and the second member 40 after welding can be more reliably prevented. In addition, only the portions to be welded can be heated by the laser light. Therefore, as compared to a case where the entire area of the bus bar is heated for welding, a bus bar can be manufactured without worrying about deformation and discoloration due to heat.

Further, the surface roughness before welding of the welding portion 21 in at least either the first member 30 or the second member 40 is higher than that of other portions in the first member 30 and the second member 40. Therefore, an increase in the contact area to be welded between the first member 30 and the second member 40 is expected, and stronger welding can be realized.

Other Aspects

The invention is not limited to the embodiment, and various modification examples can be adopted within the scope of the invention. For example, the invention is not limited to the above-described embodiment, and modifications, improvements, and the like can be appropriately made. In addition, the materials, shapes, dimensions, numbers, disposition positions, and the like of various components in the embodiment are arbitrary and are not particularly limited as long as the invention can be achieved.

Figure 5A:
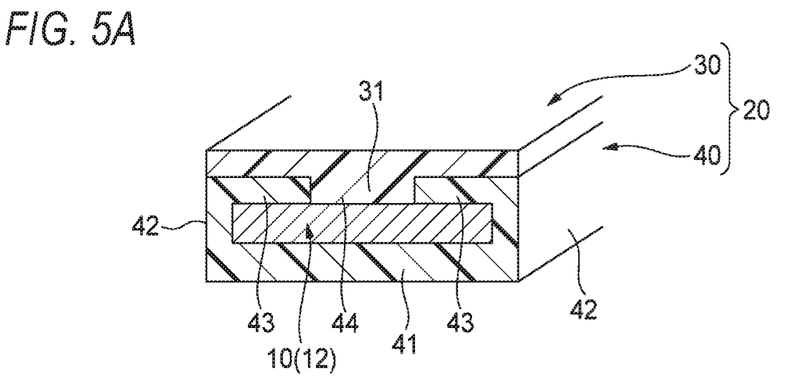
FIGS. 5A to 5C are views corresponding to FIG. 2 and illustrating a bus bar according to a modification example of the embodiment of the invention.

For example, in the embodiment, the first member 30 is disposed so as to be interposed between the pair of side wall portions 42 of the second member 40 (refer to FIG. 2). However, as illustrated in FIG. 5A, the first member 30 may be disposed so as to be placed on upper surfaces of the pair of side wall portions 42 and the upper surfaces of the pair of welding pieces 43 without being interposed between the pair of side wall portions 42. In the example illustrated in FIG. 5A, the pair of welding pieces 43 extend from upper end portions (instead of the intermediate positions in the up-down direction) of the inner surfaces of the pair of side wall portions 42 in the width direction to the inside in the width direction. In FIG. 5A, the welding portions 21 are not illustrated. The same shall be applied to FIGS. 5B and 5C.

Figure 5B:
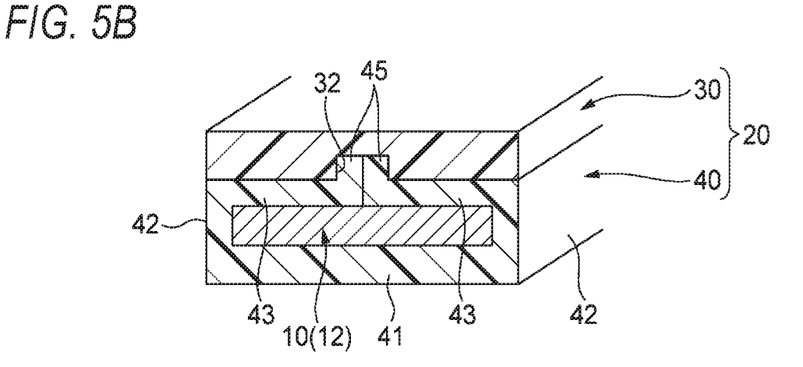

In addition, in the embodiment, the first member 30 and the second member 40 are disposed such that the protrusion part 31 of the first member 30 is inserted into the recess part 44 of the second member (refer to FIG. 2). As illustrated in FIG. 5B, the first member 30 and the second member 40 may be disposed such that protrusion parts 45 of the second member 40 are inserted into a recess part 32 of the first member 40. In the example illustrated in FIG. 5B, the recess part 32 is formed on the lower surface of the first member 30, and the protrusion parts 45 are formed on upper surfaces of tip end portions that are in contact with the pair of welding portions 43 of the second member 40.

Figure 5C:
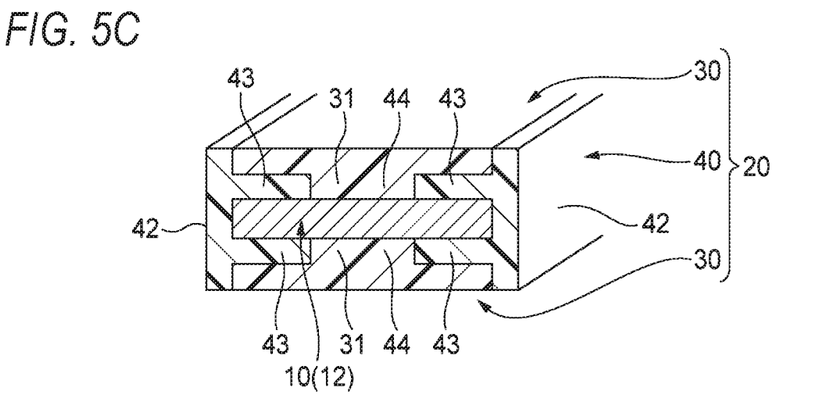

In addition, in the embodiment, the second member 40 has a shape having a U-shape in cross-section formed by the bottom wall portion 41 and the pair of side wall portions 42, and opened upwardly (refer to FIG. 2). However, as illustrated in FIG. 5C, the bottom wall portion 41 may not be provided in the second member 40, and the second member 40 may have a vertically symmetrical structure in which the upward structure of the main body 10 illustrated in FIG. 2 is vertically inverted instead of providing the bottom wall portion 41 on the lower side of the main body 10.

In addition, in the embodiment, the main body 10 has shape that extends in a U-shape while being three-dimensionally curved. However, the main body 10 may have a shape that extends in a U-shape while being two-dimensionally (in the same plane) curved. In addition, the main body 10 may have a shape other than a U-shape. For example, the main body 10 may be configured as a conductor having circular shape in cross-section instead of as the thin sheet-shaped conductor.

In addition, the first member 30 and the second member 40 are disposed such that the protrusion part 31 of the first member 30 is inserted into the recess part 44 of the second member (refer to FIG. 2) in the embodiment. However, both the first member 30 and the second member 40 may have no protrusion part and no recess part.

Here, the characteristics of the embodiment of the bus bar according to the invention and the method of manufacturing the same will be collectively and briefly described in the following [1] to [6].

[1] A bus bar (1) comprising:
a main body (10) having conductivity; and
an insulative body (20) covering the main body (10),
wherein the insulative body (20) includes a first member (30) that allows transmission of laser light having a predetermined wavelength, a second member (40) that absorbs the laser light, and a welding portion (21),
wherein the first member (30) and the second member (40) are welded to each other at least at a part of a contact portion between the first member (30) and the second member (40) in the welding portion (21), and
wherein the main body (10) includes a contact point (11) exposed from the insulative body (20).

[2] The bus bar according to [1],
wherein the main body (10) has a curved shape.

[3] The bus bar according to [1] or [2],
wherein either the first member (30) or the second member (40) has a protrusion part (31, 45) protruding to the other of the first member or the second member,
wherein the other of the first member (30) or the second member (40) has a recess part (41, 32) corresponding to the protrusion part (31, 45), and
wherein the first member (30) and the second member (40) are welded to each other in a state that the protrusion part (31, 45) is inserted into the recess part (44, 32).

[4] The bus bar according to [3],
wherein the main body (10) is a thin sheet-shaped conductor,
wherein the first member (30) is disposed along a main surface of the main body (10), and
wherein the second member (40) includes a pair of side walls (42) covering the main body (10) and the first member (30) so as to interpose the main body (10) and the first member (30) between the pair of side walls in a width direction of the main body, and a welding piece (43) extending from the pair of side walls (42) to a gap between the main body (10) and the first member (30).

[5] A method of manufacturing a bus bar (1) including a main body (10) having conductivity and an insulative body (20) covering the main body (10), the method comprising:
covering the main body (10) with a first member (30) and a second member (40) in a state that a part of the main body (10) is exposed as a contact point (11), the first member (30) allowing transmission of laser light having a predetermined wavelength, and the second member (40) absorbing the laser light; and
welding the first member (30) and the second member (40) to each other at least at a part of a contact portion between the first member (30) and the second member (40) so as to form the insulative body (20).

[6] The method of manufacturing the bus bar according to [5],
wherein at least one of the first member (30) and the second member (40) has a surface to be welded on which roughness is higher than roughness on a surface not to be welded, before the welding.

DESCRIPTION OF REFERENCE NUMERALS AND SIGNS

1 . . . bus bar
10 . . . conductive main body
11 . . . contact points
20 . . . insulative body
21 . . . pair of welding portion
30 . . . first member
31 . . . protrusion part
32 . . . recess part
40 . . . second member
42 . . . side wall portion
43 . . . welding piece
44 . . . recess part
45 . . . protrusion part

What is claimed is:
1. A bus bar comprising:
a main body having conductivity; and
an insulative body covering the main body,
wherein the insulative body includes a first member that allows transmission of laser light having a predetermined wavelength, a second member that absorbs the laser light, and a welding portion,
wherein the first member and the second member are different bodies from each other and are welded to each other at least at a part of a contact portion between the first member and the second member in the welding portion, and
wherein the main body includes a contact point exposed from the insulative body.

2. The bus bar according to claim 1,
wherein the main body has a curved shape.

3. The bus bar according to claim 1,
wherein one of the first member and the second member has a protrusion part protruding to the other of the first member or the second member,
wherein the other of the first member or the second member has a recess part corresponding to the protrusion part, and
wherein the first member and the second member are welded to each other in a state that the protrusion part is inserted into the recess part.

4. The bus bar according to claim 3,
wherein the main body is a thin sheet-shaped conductor, wherein the first member is disposed along a main surface of the main body, and wherein the second member includes a pair of side walls covering the main body and the first member so as to interpose the main body and the first member between the pair of side walls in a width direction of the main body, and a welding piece extending from the pair of side walls to a gap between the main body and the first member.

5. The bus bar according to claim 1, wherein a portion of the second member is sandwiched between the first member and the main body.

6. The bus bar according to claim 5, wherein the welding portion is sandwiched between the portion of the second member and the first member in a direction extending away from the main body.

7. The bus bar according to claim 1, wherein the first member has a different laser light transmission or absorption property from the second member, with respect to the laser light having the predetermined wavelength.

8. A manufacturing method for a bus bar including a main body having conductivity and an insulative body covering the main body, the method comprising:

covering the main body with a first member and a second member in a state that a part of the main body is exposed as a contact point, the first member allowing transmission of laser light having a predetermined wavelength, second member absorbing the laser light, and the first member and the second member being different bodies from each other; and welding, with the laser light, the first member and the second member to each other at least at a part of a contact portion between the first member and the second member so as to form the insulative body.

9. The method of manufacturing the bus bar according to claim 8, wherein at least one of the first member and the second member has a surface to be welded on which roughness is higher than roughness on a surface of the at least one of the first member and the second member not to be welded, before the welding.

10. The method of manufacturing the bus bar according to claim 8, wherein the covering the main body with the first member and the second member includes sandwiching a portion of the second member between the first member and the main body.

11. The method of manufacturing the bus bar according to claim 10, wherein the welding includes welding the portion of the second member to the first member such that a welding portion is formed, the welding portion being sandwiched between the portion of the second member and the first member in a direction extending away from the main body.

12. The method of manufacturing the bus bar according to claim 8, wherein the first member has a different laser light transmission or absorption property from the second member, with respect to the laser light having the predetermined wavelength.

13. The method of manufacturing the bus bar according to claim 8, wherein the welding the first member and the second member to each other, so as to form the insulative body, occurs after covering the main body with the first member and the second member.

14. The method of manufacturing the bus bar according to claim 8, wherein the welding includes irradiating, with the laser light having the predetermined wavelength, the second member through the first member.

15. A bus bar comprising:

a main body having conductivity; and an insulative body covering the main body, wherein the insulative body includes a first member that allows transmission of laser light having a predetermined wavelength, a second member that absorbs the laser light, and a welding portion, wherein the first member and the second member are welded to each other at least at a part of a contact portion between the first member and the second member in the welding portion, wherein the main body includes a contact point exposed from the insulative body, wherein one of the first member and the second member has a protrusion part protruding to the other of the first member or the second member, wherein the other of the first member and the second member has a recess part corresponding to the protrusion part, and wherein the first member and the second member are welded to each other in a state that the protrusion part is inserted into the recess part.

16. The bus bar according to claim 15, wherein the main body is a thin sheet-shaped conductor, wherein the first member is disposed along a main surface of the main body, and wherein the second member includes a pair of side walls covering the main body and the first member so as to interpose the main body and the first member between the pair of side walls in a width direction of the main body, and a welding piece extending from the pair of side walls to a gap between the main body and the first member.

* * * * *